(12) United States Patent
AlThumayri

(10) Patent No.: US 10,080,352 B2
(45) Date of Patent: Sep. 25, 2018

(54) AQUARIUM UNDERGRAVEL FILTER

(71) Applicant: Bassam AlThumayri, Riyadh (SA)

(72) Inventor: Bassam AlThumayri, Riyadh (SA)

(73) Assignee: Bassam AlThumayri, Riyadh (SA)

( * ) Notice: Subject to any disclaimer, the term of this patent is extended or adjusted under 35 U.S.C. 154(b) by 136 days.

(21) Appl. No.: 15/124,451

(22) PCT Filed: Feb. 22, 2015

(86) PCT No.: PCT/SA2015/000003
§ 371 (c)(1),
(2) Date: Sep. 8, 2016

(87) PCT Pub. No.: WO2015/142226
PCT Pub. Date: Sep. 24, 2015

(65) Prior Publication Data
US 2017/0013812 A1    Jan. 19, 2017

(30) Foreign Application Priority Data

Mar. 18, 2014 (SA) ................................. 114350369

(51) Int. Cl.
*A01K 63/04* (2006.01)
*B01D 24/00* (2006.01)
(Continued)

(52) U.S. Cl.
CPC ............ *A01K 63/045* (2013.01); *B01D 24/00* (2013.01); *B01D 35/02* (2013.01); *C02F 1/00* (2013.01);
(Continued)

(58) Field of Classification Search
CPC ...... A01K 63/045; B01D 24/00; B01D 35/02; B01D 2201/29; B01D 2101/04;
(Continued)

(56) References Cited

U.S. PATENT DOCUMENTS

| | | | | |
|---|---|---|---|---|
| 3,179,084 A | * | 4/1965 | Norris | A01K 63/003 119/253 |
| 3,785,342 A | * | 1/1974 | Rogers | A01K 63/045 119/259 |
| 4,921,614 A | * | 5/1990 | Frickman | A01K 63/045 119/264 |
| 5,783,070 A | * | 7/1998 | Lee | A01K 63/045 119/264 |
| 6,065,430 A | * | 5/2000 | Sheriff | A01K 63/00 119/227 |

(Continued)

FOREIGN PATENT DOCUMENTS

EP        0826637 A2 *  3/1998

*Primary Examiner* — Fred Prince

(74) *Attorney, Agent, or Firm* — Geeta Kadambi; Riddhi IP LLC

(57) ABSTRACT

A surface filter for aquarium water purification is placed on the bottom of the aquarium that sucks the waste out of the tank to the canister filter. Small plastic pieces make and connect the main stream channels. Each plastic piece is composed of a couple of inverted pyramids that acts like a funnel. Water flows through the main channels sucked by an external filter. In the base of each inverted pyramid a small hole opens to the drainage channel, which has a hollow inverted V shape. Water, particles and fish waste are passed through the channels to the external filter. At the end of the assembly a cross channel collects the drained water. Collected water is transferred to the external filter outside the aquarium. A hose connects the external filter with the collector. Another hose is connected to the same filter to return the filtered water back to the aquarium.

4 Claims, 12 Drawing Sheets

(51) Int. Cl.
*B01D 35/02* (2006.01)
*C02F 1/00* (2006.01)
C02F 101/00 (2006.01)
C02F 103/20 (2006.01)

(52) U.S. Cl.
CPC ...... *B01D 2101/04* (2013.01); *B01D 2201/28* (2013.01); *C02F 2101/00* (2013.01); *C02F 2103/20* (2013.01); *C02F 2303/20* (2013.01); *C02F 2307/00* (2013.01)

(58) Field of Classification Search
CPC .... C02F 1/00; C02F 2101/00; C02F 2103/20; C02F 2303/20; C02F 2307/00
USPC .................. 210/167.23, 167.24; 119/259
See application file for complete search history.

(56) References Cited

U.S. PATENT DOCUMENTS

| | | | | |
|---|---|---|---|---|
| 6,234,113 | B1 * | 5/2001 | Dor ................. | A01K 63/003 119/245 |
| 6,659,043 | B1 * | 12/2003 | Huska ............... | A01K 63/045 119/226 |
| 7,537,692 | B1 * | 5/2009 | Hadden ............. | A01K 63/045 119/259 |
| 2004/0074840 | A1 * | 4/2004 | Henkennans ....... | A01K 63/04 210/615 |
| 2004/0251186 | A1 * | 12/2004 | Ohanian ............ | A01K 63/003 210/167.21 |
| 2013/0152866 | A1 * | 6/2013 | Turover ............. | A01K 63/04 119/264 |

* cited by examiner

AQUARIUM UNDERGRAVEL FILTER

CROSS REFERENCE TO RELATED APPLICATION

This application claims priority to PCT Application PCT/SA2015/000003 filed on 22 Feb. 2015 which is pending. This instant application is a national stage entry application for PCT/SA2015/000003 and the said PCT application is hereby incorporated by reference in its entireties for all its teachings.

FIELD OF INVENTION

The instant application is shows a unique filter for an aquarium.

BACK GROUND OF THE INVENTION

Generally this invention is related to water filtration specifically fish tank filtration. Taking into account fish tank filters in the market does not fully filter the tank or most of it. There are different types of Aquarium filters. One of the famous filters is small filter placed inside the aquarium (submerged). It is mostly placed in the middle of the tank to filter the water. This filter also has a small pump on the top of the filter that drags the water through the sponge. However, this type of filters is only able to clean up the surrounding area near the filter. In addition, it is unable to clean up waste which is under the stone layer. The filter usually has a small sponge and it needs to be cleaned at least once every couple of weeks.

Therefore, this filter requires to be taken out to be cleaned and installed again. Another common filter types is an undergravel filter, which is installed on the bottom of the tank and usually under a gravel layer. This filter is made of rectangular plastic plates with slits. The filter has two vertical pipes, which contains air hose to produce bubbles. This helps to accumulate wastes in the filter in the bottom of aquarium thus helping to clean the water. It is recommended to place a cotton layer under or over the filter plates to capture waste. However, this technique will only hold the waste inside the cotton.

Consequently, the fish keeper must remove the cotton before it contaminates the water with toxins from the waste. Furthermore, in order to take out the filter he/she has to remove all the objects that are in the tank, which is a hindering task to do. In most cases, this operation causes water turbidity. There is another kind of filters called canister filter acts to clean and purify the water.

This filter places outside the aquarium tank and it has two hoses. One hose to suck the water from the tank and the other hose to return the filtered water back to the aquarium. This type of filters is only able to clean up the surrounding area near the sucking hose. Therefore, there is a need for a filter to be able to mostly or fully filter a fish tank from waste, dirt, or leftovers without the intervention of the fish keeper to clean the tank.

SUMMARY OF INVENTION

This invention provides a filter for an aquarium tank used for waste, dirt and leftovers suction from every part of the filter and sending them to the external filter. Other filters hides waste under the gravel and prevents them from exiting the tank. A unique feature for the filter it can be adjustable by adding/removing filter pieces to fit most aquarium tank sizes. In addition, the fish keepers will only focus on cleaning the external filter to keep the aquarium clean. As a result, the fish keeper may not have to clean the aquarium and just cleaning the external filter approximately once every three or four months would be enough.

Dragging waste to the bottom of the tank and removing it to the external filter and this achieved by this filter. The filter consists of:

Every part of the filter is composed of a couple of inverted pyramids that acts like a funnel, which force waste to fall in the drain hole, FIG. 2a no. (10). In the base and between every two inverted pyramids small holes open to the drainage channel, which has a hollow inverted V shape FIG. 3a no. (11). this channel sucks waste and water through the drain holes at the bottom of each funnel. A cross channel (collector) collects the drained water from the drainage channel and sending it to the suction tube FIG. 5 no. (23).

BRIEF DESCRIPTION OF THE DRAWINGS

FIG. 2B top view dimensions in centimeters of one piece filter.
FIG. 4 two filter pieces connected together after installation.

DETAILED DESCRIPTION OF THE PREFERRED EMBODIMENTS

Figure 6:
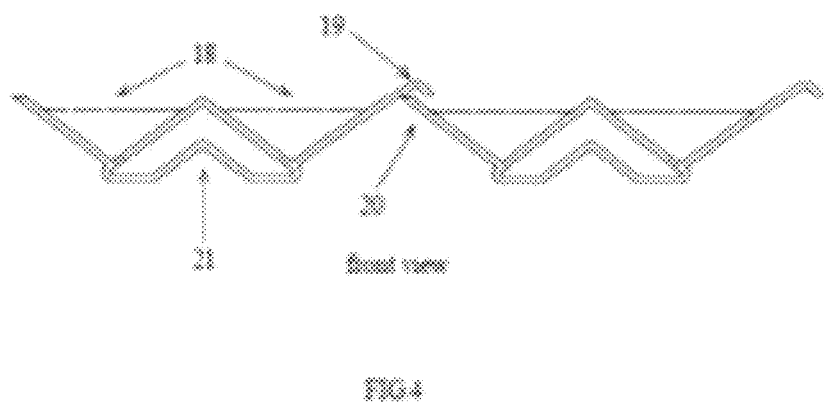
FIG. 6 filter dimensions similar to FIG. 5 but without tube.
Figure 9:
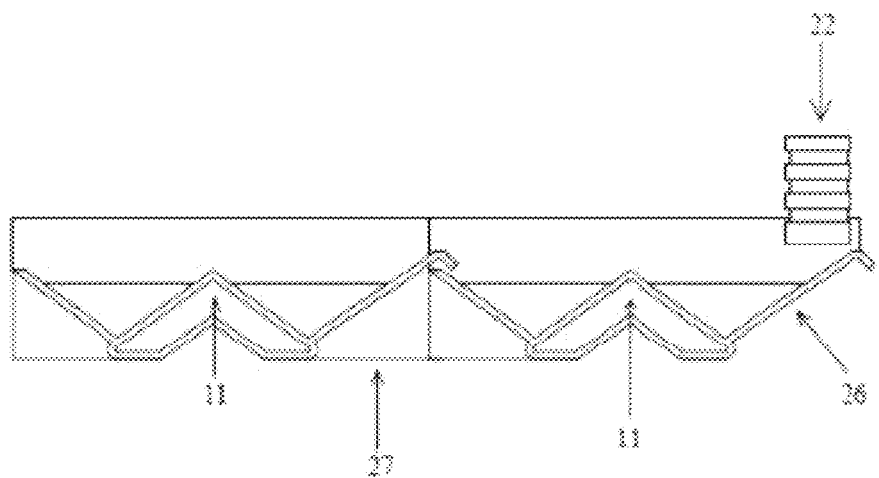
FIG. 9 front view of two filter pieces installed together with the main suction tube.
Figure 10:
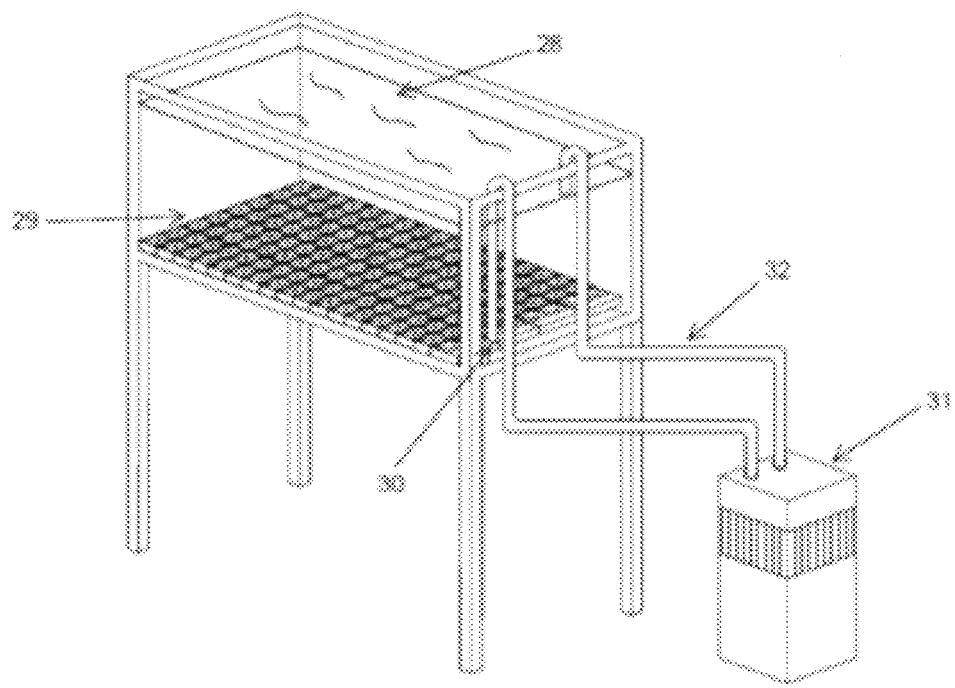
FIG. 10 the final form for the filter after installation it in the aquarium and connected to the external filter.

FIG. 1, FIG. 2a, FIG. 2b, FIG. 3a, FIG. 3b, FIG. 4, FIG. 5, FIG. 6, FIG. 7, FIG. 8, FIG. 9, and FIG. 10 will explain the filter's operation as follow: In the beginning, the filter is composed of small filter pieces as explained. To install the filter into a single piece the piece shown in FIG. 5 will be the first piece. The next piece shown in FIG. 6 is connected to the first piece making a single piece as shown in FIG. 9. Then continue installing the rest of the filter pieces side by side until it covers the width of the tank. The last filter piece is sealed on its end side to allow the water passing through drain holes only. After completing the filter width each piece is attached by a series of filter pieces (FIG. 3A) covering the length of the aquarium tank. The drainage channel also should be sealed in the last piece side of the filter to allow the water passing through drain holes only. Filter pieces are locked with each other front to back (a click sound is heard between each two indicating they are locked). Then an external filter hose (FIG. 10) (32) is placed inside the aquarium tank 28 (outlet) while another hose (inlet) is connected to the external filter 30 with the suction tube (FIG. 5) (22).

Figure 1:
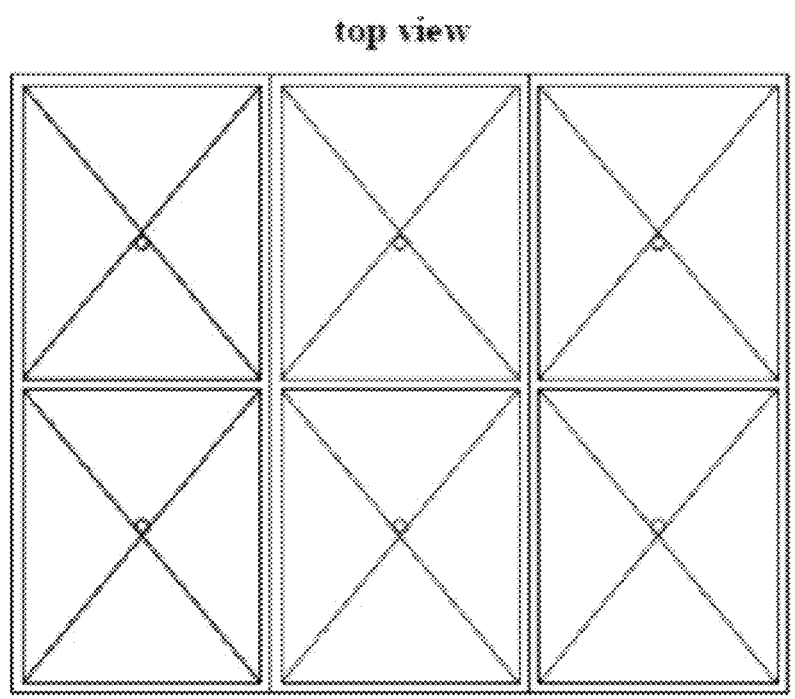
FIG. 1 top view of three filter pieces connected together.
Figure 2A:
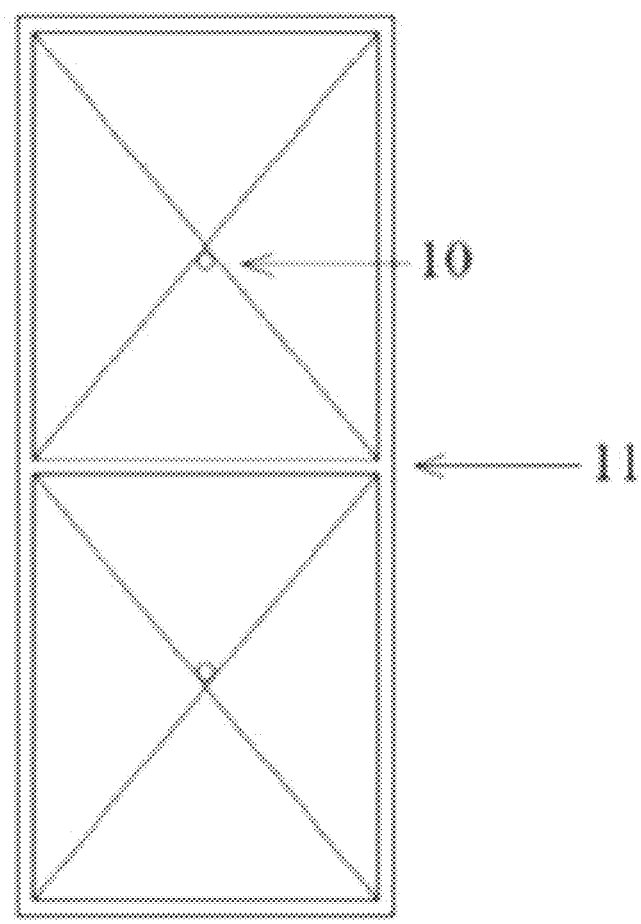
FIG. 2A drain hole at the bottom of the filter piece (10) and drainage channel (11).
Figure 2B:
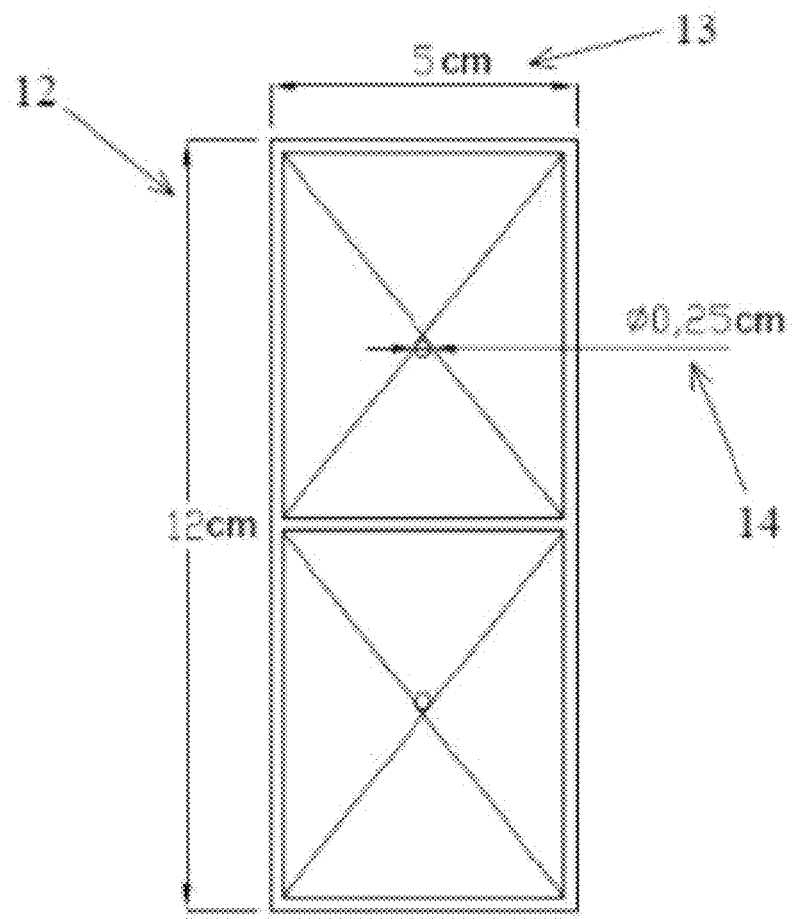
Figure 3A:
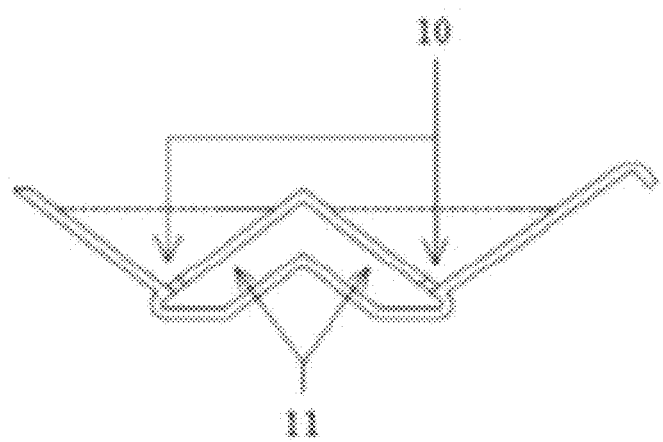
FIG. 3A front view of the filter piece showing drain hole (10) and drainage channel location (11).
Figure 3B:
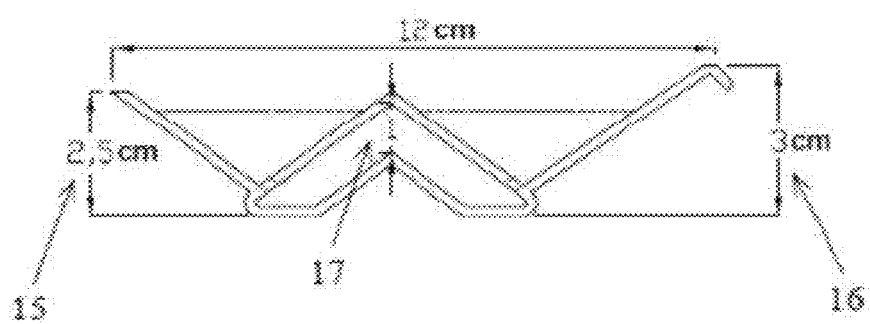
FIG. 3B front view dimensions in centimeters of the filter.

Finally, a plastic mesh is placed and fitted (FIG. 4) (18) on top the filter pieces. The plastic mesh consists of small holes (about 2 mm) to allow tiny parts passing through, and prevent large parts like gravel to go inside the filter. Now the filter is installed in the aquarium tank (FIG. 10) (29). After assembling the filter in the aquarium and the external filter (31) will start to suck the water from the hose (30) through the drain holes (10). A stream is generated at each drain hole due to the location of each hole (at the bottom of the funnel) and the force generated from the external filter. Therefore, waste and other particles will smoothly pass through the drain holes. After that the water and waste will flow to the drainage channel (11) (FIG. 2A) (FIG. 3A). FIG. 2B top view dimensions in centimeters of one piece filter (12 is 12 cm, 14 the hole is 0.25 cm and width 13 is 5 cm). The drainage channel is designed to be shaped similar to a hollow inverted V shape (FIG. 4) (21). It is made for two reasons: 1) when waste passes to the drainage channel it slips and rises up to the top of the channel because of the narrow path. Also, the friction between the waste and channel will reduce since the surface area in the inverted V is small. Without the inverted V design the waste will be accumulate in the middle of the drainage channel since the flow will be reduced due to the large area of a normal channel (round or triangle shape).

Figure 5:
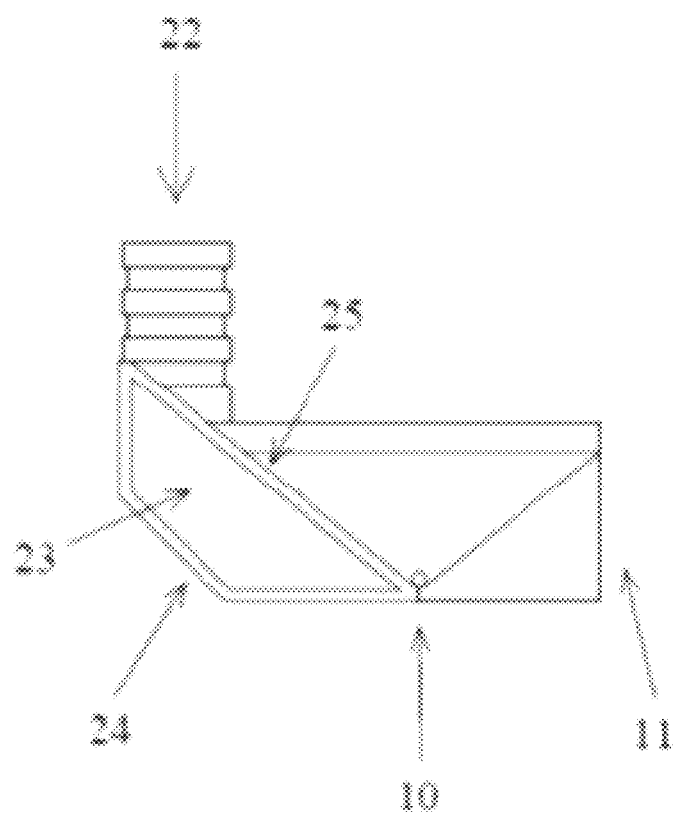
FIG. 5 Side view of the filter piece containing the tube (22) for water suction, cross channel (collector) (23), drain hole (10), and drainage channel (11).
Figure 6:
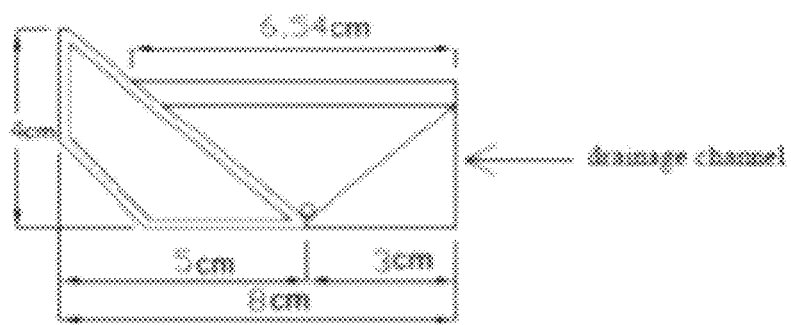
Figure 7:
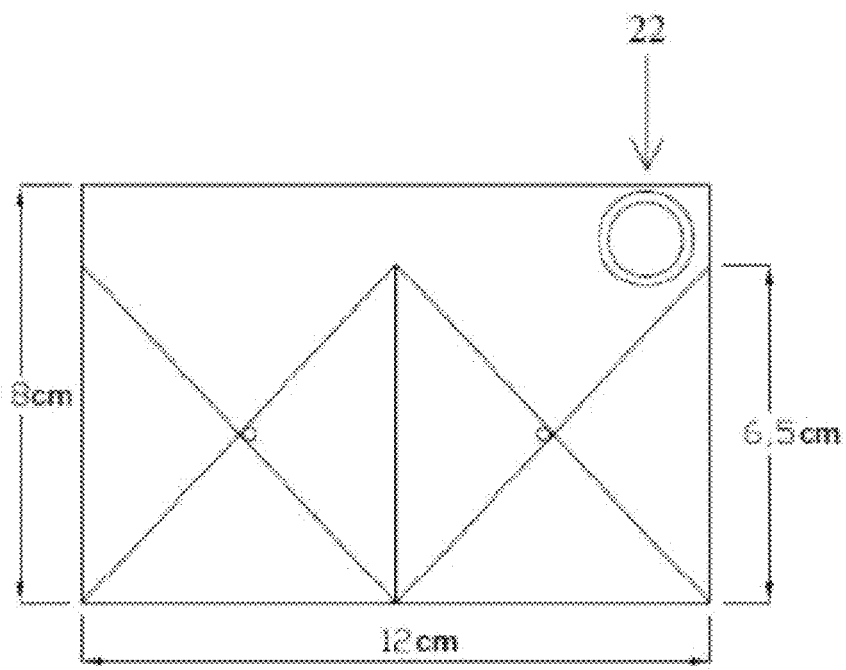
FIG. 7 top view of the filter in FIG. 5.
Figure 8:
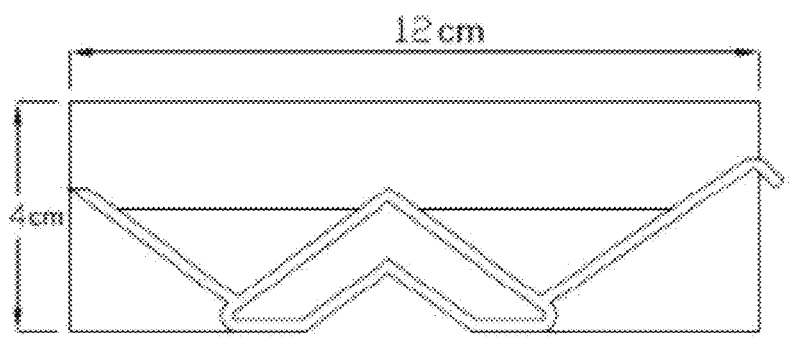
FIG. 8 front view of the filter in FIG. 6.

In addition, the middle area of the drainage channel becomes closer to the streams coming from the drain holes due to the shape of the channel. 2) The inverted V tube is there to reduce the internal volume of the channel where the distance between the two internal walls (15 and 16) is 1 cm (FIG. 3B) (17). This reduced volume works to increase the water flow, which helps to drag waste out of the drainage channel. Then water along with the waste falls into the cross channel (collector) (23) and then sucked by the section tube (22) as shown in (FIG. 5). In the cross channel there is an oblique corner (24) made to reduce the internal area for it. In addition, it increases the water flow which assists in taking the waste out from the cross channel to the external filter (31). As well, the cross channel is designed with an oblique corner to fit the side of the funnel piece (25) to not affect the funnel shape. There is another oblique corner (26) (FIG. 9) that helps the water and waste go to the external filter faster. This oblique corner exists only at the side of the filter that has the suction tube while other parts of the filter does not have oblique corner (27). In addition, this cross channel (collector) can decrease the power used by the external filter for water suction by eliminating multiple collection tubes into one collector tube.

This will let the water flow in one way to the suction tube instead of using traditional elbow for each drainage channel and connecting them together. The traditional elbows may slow down the water speed or flow because the water passing through each elbow may run into each other to cross to the suction tube. The outlet hose 30 that comes from the external filter 31 sucks the water and waste through section tube 22. Then hose 32 will return the filtered water back to the aquarium. Each filter piece has dented side 19, which overlaps the opposite side of the next filter piece 20. Both were created in two different heights to be able to fit one another and make it easy to install (FIG. 4). In addition, these two fitted sides will prevent waste and other particles from passing through to the base of the aquarium; hence the waste and particles will be forced to go to the drain holes. The process of making this filter can be made by a plastic manufacturer.

As a result, the ground filter can be achieved and used for filtering water in an aquarium tank by placing it on the bottom of the tank, which will drains the waste and moving it to the external filter.

What is claimed is:

1. An Undergravel filter for sucking water and other particles including fish waste, leftovers, and dirt from an aquarium tank to an external filter, the under ravel filter provided with a plurality of filter pieces, comprising:
    each piece composed of two funnels shaped in form of an inverted pyramid linked by a drainage channel in the center, which feeds to a cross channel configured as a collector;
    each funnel configured to act as a container and allows the water with waste to drain in the drainage channel;
    wherein the drainage channel is configured in the form of a hollow triangle shape and the drainage channel is placed between the two funnels;
    each side of the triangle composes a side of the funnel wall;
    the drainage channel is configured to drain the waste from the funnels through a drain holes at the bottom of each funnel;
    a cross channel collects the drained water and waste, wherein the collected water is transferred to the external filter outside the aquarium;
    a hose connects the external filter with the cross channel and
    a mesh is placed and fitted on top of the filter pieces, wherein the mesh consists of small holes configured to allow tiny parts passing through, and prevent large parts including gravel to go inside the filter.

2. The Undergravel filter according to claim 1, wherein each filter piece has a dented side, which overlaps the opposite side of a next filter piece.

3. The Undergravel filter according to claim 1, wherein the drainage channel is composed of tour sides, which are parallel to each other, two top sides and two bottom sides, wherein the top sides form the wall and bottom sides taper to form the channel for increasing the flow of water.

4. The Undergravel filter according to claim 1, wherein the cross channel collects the water and waste from the drainage channels into a suction tube and is placed in the first filter.

* * * * *